United States Patent
Zhang

(10) Patent No.: US 7,337,372 B2
(45) Date of Patent: Feb. 26, 2008

(54) METHOD AND APPARATUS FOR DETECTING MULTI-HIT ERRORS IN A CACHE

(75) Inventor: Kevin X. Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 10/639,071

(22) Filed: Aug. 11, 2003

(65) Prior Publication Data

US 2004/0049713 A1    Mar. 11, 2004

Related U.S. Application Data

(63) Continuation of application No. 09/457,932, filed on Dec. 8, 1999, now Pat. No. 6,622,267.

(51) Int. Cl.
    *G06F 11/00* (2006.01)
(52) U.S. Cl. .................. 714/54; 711/128; 711/131
(58) Field of Classification Search .............. 714/53, 714/54, 48; 711/128, 13, 131
    See application file for complete search history.

(56) References Cited

U.S. PATENT DOCUMENTS

| | | | | |
|---|---|---|---|---|
| 4,833,601 A | * | 5/1989 | Barlow et al. | 711/121 |
| 5,353,424 A | * | 10/1994 | Partovi et al. | 711/128 |
| 5,471,415 A | * | 11/1995 | McClure | 365/49 |
| 5,748,070 A | * | 5/1998 | Priebe et al. | 327/53 |
| 5,835,951 A | * | 11/1998 | McMahan | 711/128 |
| 5,854,943 A | * | 12/1998 | McBride et al. | 710/51 |
| 6,366,978 B1 | * | 4/2002 | Middleton et al. | 365/49 |
| 6,622,267 B1 | * | 9/2003 | Zhang | 714/53 |
| 6,708,294 B1 | * | 3/2004 | Nakao et al. | 714/42 |
| 2006/0010354 A1 | * | 1/2006 | Azevedo et al. | 714/48 |
| 2006/0026382 A1 | * | 2/2006 | Hirano et al. | 711/207 |
| 2006/0265551 A1 | * | 11/2006 | Grandou et al. | 711/128 |

OTHER PUBLICATIONS

Ooi et al, "Fail-Soft Circuit Design in a cahe Memory Control LSI", Feb. 1987, ISSCC 87, pp. 103-104.*

Katz, Randy H. "Contemporary Logic Design", 1994, The Benjamin/Cummings Publishing Company, Inc., pp. 13, 49, & 181.*

* cited by examiner

*Primary Examiner*—Christopher McCarthy
(74) *Attorney, Agent, or Firm*—Blakely, Sokoloff, Taylor & Zafman LLP

(57) ABSTRACT

Multi-hit errors in a processor cache are detected by a multi-hit detection circuit coupled to the hit lines of the cache. The multi-hit detection circuit compares pairs of hit signals on the hit lines to determine if any two hit signals both indicate a hit. If multiple hits are detected, an error flag indicating the occurrence of multiple hits is generated.

7 Claims, 3 Drawing Sheets

METHOD AND APPARATUS FOR DETECTING MULTI-HIT ERRORS IN A CACHE

This application is a continuation application of U.S. patent application Ser. No. 09/457,932, filed Dec. 8, 1999 now U.S. Pat. No. 6,622,267.

The present invention relates to computer systems and more particularly to accessing a cache with multi-hit error detection.

BACKGROUND

Computer systems, from handheld electronic devices to medium-sized mobile and desktop systems to large servers and workstations, are becoming increasingly pervasive in our society. Each computer system includes one or more processors. A processor manipulates and controls the flow of data in a computer. Decreasing the size of the processor will tend to decrease its manufacturing cost. Improving processor reliability tends to improve the overall quality of the computer. Processor designers employ many different techniques to decrease processor size and to improve reliability to create less expensive and more robust computers for consumers.

One reliability problem arises from occurrences known as soft errors. A soft error is a situation in which a bit is set to a particular value in the processor and spontaneously changes to the opposite value (e.g. from a logical "1" to a logical "0", or vice-versa), thereby corrupting the associated data. A soft error may be caused by cosmic rays passing through a storage element within the processor, charging or discharging the storage element, thereby causing a stored bit to change its value.

As processor supply voltages continue to be reduced in an effort to lower processor power consumption, the difference in voltage values that define the 1's and 0's of bits is reduced as well. This makes processors more susceptible to soft errors. In addition, as storage elements become more densely packed within processors, the likelihood of a soft error increases.

One way to combat soft errors is through the use of error correction or error detection bits. The most common type of error correction and error detection bits are parity bits. One type of parity bit works by indicating whether the number of bits with a logical value of 1 is odd or even in a given data value. For example, for a 64 bit value containing 22 bits with a value of 0 and 42 bits with a value of 1, the parity bit is set to 0 (assuming even parity), indicating that the associated 64 bit data structure contains an even number of bits with a value of 1. If the processor transfers or stores this 64 bit value with parity checking, 65 bits are actually transferred or stored, the original 64 bit value plus the parity bit.

If a soft error occurs to any one bit of the 64 bits during transfer or storage, it can be detected by the processor. For example, if a bit with a value of 0 flips to a 1 by soft error, the 64 bit value would then contain 21 bits with a value of 0 and 43 bits with a value of 1. By performing a parity check on the 64 bit value, the soft error is detected because the odd number of bits with a value of 1 no longer agrees with the previously set parity bit corresponding to an even number of bits having a value of 1. Upon detecting the soft error, the processor may regenerate the original 64 bit value to preserve the integrity of the data.

One area where soft errors are of particular concern is in the cache. A cache is storage space located close to the processor, or in some cases within the processor, for fast data access by the processor. The processor finds data inside the cache by matching a portion of a desired data address, called a lookup tag, to the same portion of a data address stored in the cache, called a cache tag.

If a cache tag is found that matches the lookup tag, this is referred to as a hit, and the associated data is assumed to be the data desired by the processor. In the presence of soft errors, however, it is possible for a lookup tag to match two cache tags. For example, a lookup tag may match a first cache tag associated with the desired data, and a second cache tag that has been corrupted by a soft error to look identical to the first tag.

To handle the occurrence of multiple hits, processor designers have designed parity check circuitry into their caches. Parity bits are generated and stored with their associated tags in the cache. In the event two cache tags match a single lookup tag, the two cache tags are parity checked against their associated parity bits to determine which of the two tags is corrupted and which is the true match. Unfortunately, the circuits necessary to accommodate multiple hits and to perform parity checking in this manner are large and complex, increasing processor size and power consumption.

The present invention addresses this and other problems associated with the prior art.

SUMMARY OF THE INVENTION

In accordance with one embodiment of the present invention, a processor includes a cache and a multi-hit detection circuit. The cache has a plurality of hit lines which the multi-hit detection circuit uses to detect multiple hits based on hit signals on the hit lines. The multi-hit detection circuit then generates an error flag indicating the occurrence of multiple hits.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

Figure 1:
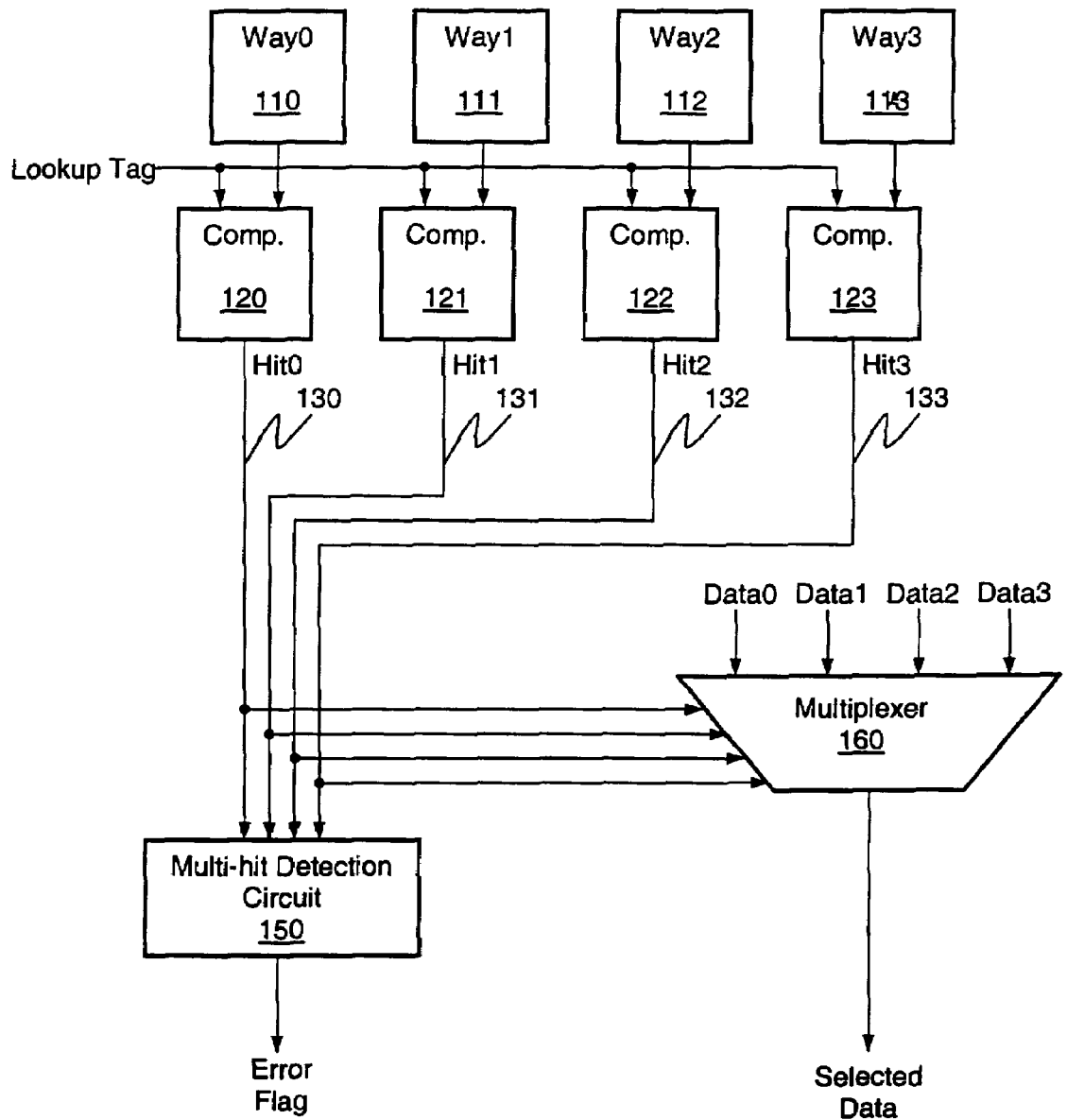
FIG. 1 is a circuit formed in accordance with an embodiment of the present invention.

In accordance with an embodiment of the present invention, the cache tags from each way of an indexed set in a cache are compared against a lookup tag to generate a hit signal associated with each cache tag. Each of these hit signals are provided to a multiplexer to select the appropriate data associated with the matching cache tag (assuming a hit has occurred) from the indexed set.

In addition to providing the hit signals to the multiplexer, the hit signals are provided to a multi-hit detection circuit. The multi-hit detection circuit compares each hit signal to every other hit signal to determine if any two hit signals both indicate a hit in the cache. These comparisons may all be done simultaneously by a NAND gate having series-coupled pull-down transistor pairs coupled to all pairing combinations of the hit lines that provide the hit signals. If any two hit signals both indicate a hit in the cache, the output node of the NAND gate is pulled low, generating an error flag (which may be inverted by an inverter) indicating the presence of a multi-hit error. This error flag, which indicates the validity of the data selected by the multiplexer, may be quickly generated in parallel with the selection of the data.

A more detailed description of embodiments of the present invention, including various configurations and implementations, is provided below.

The terms "source" and "drain", as used herein, may be used interchangeably to identify either the source or drain of a p or n-channel transistor. A "pull-up" transistor is a transistor that, when activated (i.e. turned on), has a tendency to raise the voltage level at its drain, "pulling" it (or driving it) up to the approximate voltage level at its source (which is typically close to the supply voltage level). This may also be referred to as charging a node or pulling it high. A "pull-down" transistor is a transistor that, when activated, has a tendency to lower the voltage level at its drain, "pulling" it (or driving it) down to the approximate voltage level at its source (which is typically close to ground). This may also be referred to as draining a node or pulling it down.

A "line" or "node" is a physical, electrically conductive portion of a circuit that carries an electrical signal, as distinguished from the signal itself. A "voltage clamp" is a device that provides a feedback signal to its input node, and has a tendency to reinforce (or "clamp") the voltage at its input node.

The term "cache" is used to denote any storage space or plurality of storage spaces in which cache tags and other cache-related information are stored. For example, both a cache tag RAM located in a storage space apart from its associated data storage space and a cache having integrated tag and data storage space are referred to as cache. The term "data" is used herein to describe data, instructions, addresses, or any other information that can be represented by one or more bits transferred or stored within a computer system.

FIG. 1 is a circuit formed in accordance with an embodiment of the present invention implemented in a four-way set associative cache. It should be noted, however, that the present invention can be implemented in conjunction with any multi-way set associative cache including, for example, a two-way, eight-way, sixteen-way, any other number of ways, or even in a fully associative cache (which is the special case of a multi-way set associative cache having only one set).

Four ways, Way0 through Way3, 110-113 of FIG. 1, of a cache are shown. Each of ways 110-113 contains cache tags. When a lookup address comes into the cache, the address is parsed out, and the lookup tag portion of the address is provided to an input of each of comparators 120-123. The index portion of the address is used to index the appropriate set of cache tags within ways 110-113, and the indexed cache tag from each of ways 110-113 is provided to the other input of each of comparators 120-123.

Comparators 120-123 of FIG. 1 then compare the lookup tag to each of the four cache tags associated with each of the four ways 110-113 to generate hit signals Hit0, Hit1, Hit2, and Hit3 on hit lines 130-133, respectively. Hit0 indicates whether or not the lookup tag matches the cache tag from Way0 110. Hit1 indicates whether or not the lookup tag matches the cache tag from Way1 111. Hit2 indicates whether or not the lookup tag matches the cache tag from Way2 112. Hit3 indicates whether or not the lookup tag matches the cache tag from Way3 113. In accordance with the embodiment of the present invention shown in FIG. 2 (described in more detail below), a hit (i.e. a match in the comparator) is indicated by a high signal (e.g. a logical "1") on the hit line, and a miss (i.e. a mismatch in the comparator) is indicated by a low signal (e.g. a logical "0") on the hit line. For an alternate embodiment of the present invention, inverse logic may be implemented.

Hit signals Hit0-Hit3 of FIG. 1 are provided to multi-hit detection circuit 150 and to the select inputs of multiplexer 160 via hit lines 130-133, respectively. Multiplexer 160 uses the hit signals provided via hit lines 130-133 to select the appropriate data associated with the way containing the cache tag that matches the lookup tag. In the example of FIG. 1, Data0 through Data3 represent the data from the indexed set of memory locations of the cache, and are associated with Way0 through Way3, respectively. If signal Hit0 indicates a hit on hit line 130, multiplexer 160 provides Data0 at its output. If signal Hit1 indicates a hit on hit line 131, multiplexer 160 provides Data1 at its output. If signal Hit2 indicates a hit on hit line 132, multiplexer 160 provides Data2 at its output. If signal Hit3 indicates a hit on hit line 133, multiplexer 160 provides Data3 at its output.

If more than one hit signal indicates a hit, this is known as a multi-hit error, and the output from multiplexer 160 will be invalid. This invalid data, if not caught, may result in data corruption. Multi-hit detection circuit 150 of FIG. 1 is used to detect the presence of a multi-hit error, thus indicating the validity of the selected data output from multiplexer 160. Multi-hit detection circuit 150 compares each hit signal to each other hit signal to determine if any two (or more) hit signals indicate a hit. If so, the error flag that is generated by multi-hit detection circuit 150 indicates the presence of a multi-hit error, thereby indicating that the selected data from multiplexer 160 is invalid. If not, the error flag that is generated by multi-hit detection circuit 150 indicates that a multi-hit error is not present, thereby indicating that the selected data from multiplexer 160 is valid.

In accordance with an embodiment of the present invention, the error flag is generated by multi-hit detection circuit 150 of FIG. 1 very quickly. For example, for one embodiment, this flag is generated during the same clock cycle that the selected data is provided at the output of multiplexer 160. For another embodiment, this flag may be generated within one or two clock cycles of when the selected data from multiplexer 160 becomes available. By quickly generating the error flag, memory control logic can quickly receive the flag and, if necessary, may abort access of the selected data from multiplexer 160 before it is used. Preventing the use by a processor of invalid data from the cache in this manner may prevent data corruption and the faults and errors associated therewith.

Figure 2:
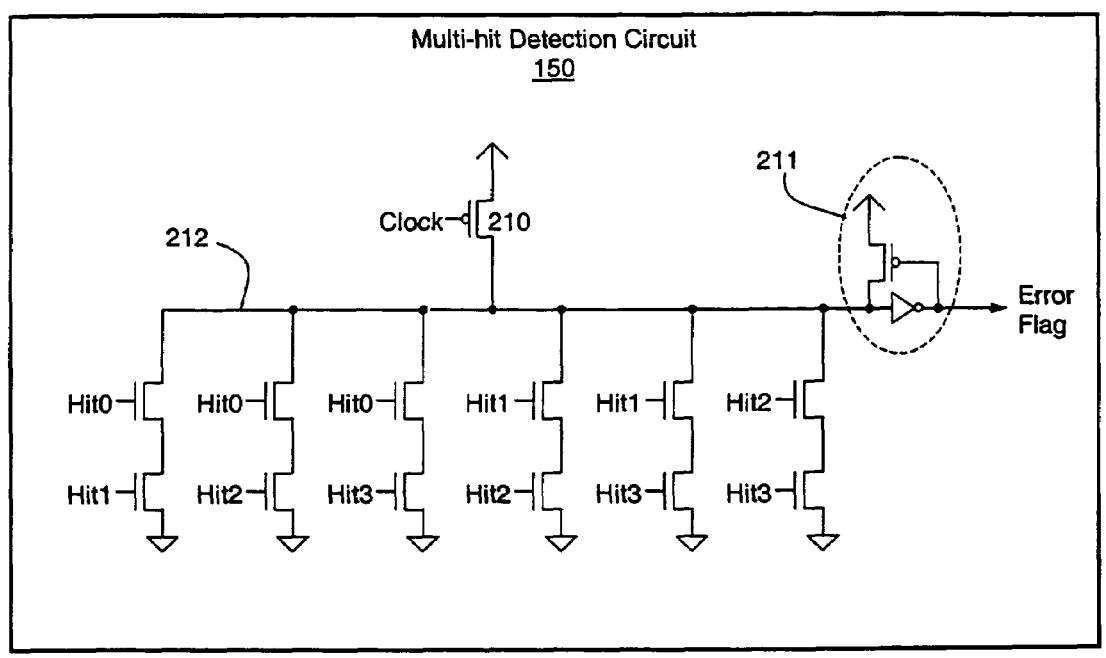
FIG. 2 shows additional detail of a portion of the circuit of FIG. 1.

FIG. 2 shows more detail of multi-hit detection circuit 150 of FIG. 1 in accordance with one embodiment of the present invention. As shown, multi-hit detection circuit 150 includes a dynamic NAND gate having output node 212. The signal at this output node is inverted through clamp 211 to produce an AND function, which is the error flag output of the detection circuit. As shown, all possible pairings of hit signals are provided to the gates of series-coupled pull-down transistor pairs.

As shown in FIG. 2, the first pull-down leg of the NAND gate includes an upper n-channel transistor having a gate coupled to hit line 130 to receive hit signal Hit0 and a lower n-channel transistor having a gate coupled to hit line 131 to receive hit signal Hit1. The second pull-down leg of the NAND gate includes an upper n-channel transistor having a gate coupled to hit line 130 to receive hit signal Hit0 and a lower n-channel transistor having a gate coupled to hit line 132 to receive hit signal Hit2. The third pull-down leg of the NAND gate includes an upper n-channel transistor having a gate coupled to hit line 130 to receive hit signal Hit0 and a lower n-channel transistor having a gate coupled to hit line 133 to receive hit signal Hit3. The fourth pull-down leg of the NAND gate includes an upper n-channel transistor having a gate coupled to hit line 131 to receive hit signal Hit1 and a lower n-channel transistor having a gate coupled to hit line 132 to receive hit signal Hit2. The fifth pull-down leg of the NAND gate includes an upper n-channel transistor having a gate coupled to hit line 131 to receive hit signal Hit1 and a lower n-channel transistor having a gate coupled to hit line 133 to receive hit signal Hit3. The sixth pull-down leg of the NAND gate includes an upper n-channel transistor having a gate coupled to hit line 132 to receive hit signal Hit2 and a lower n-channel transistor having a gate coupled to hit line 133 to receive hit signal Hit3.

In this manner, if any two (or more) hit signals indicate a hit, two series-coupled pull-down transistors will be turned on and output node 212 of FIG. 2 will be pulled down. Voltage clamp 211 includes an inverter having an input coupled to output node 212 of the NAND and having an output that provides the error flag. Thus, if any two hit signals indicate a hit, the error flag will go high, indicating the presence of a multi-hit error and further indicating that the selected data from the cache is invalid and should not be used.

Otherwise, pull-up p-channel transistor 210, the drain of which is coupled to output node 212 of the NAND gate, keeps output node 212 charged high according to the clock signal applied to its gate. Clamp 211 reinforces this charged state of the output node by providing a p-channel feedback pull-up transistor having a gate coupled to the output of the inverter. The inverter inverts the high signal on output node 212, thereby providing a low error flag at its output. This low error flag indicates that a multi-hit error is not present and the selected data is valid (or at least that the selected data is not invalid due to a multi-hit error).

Figure 3:
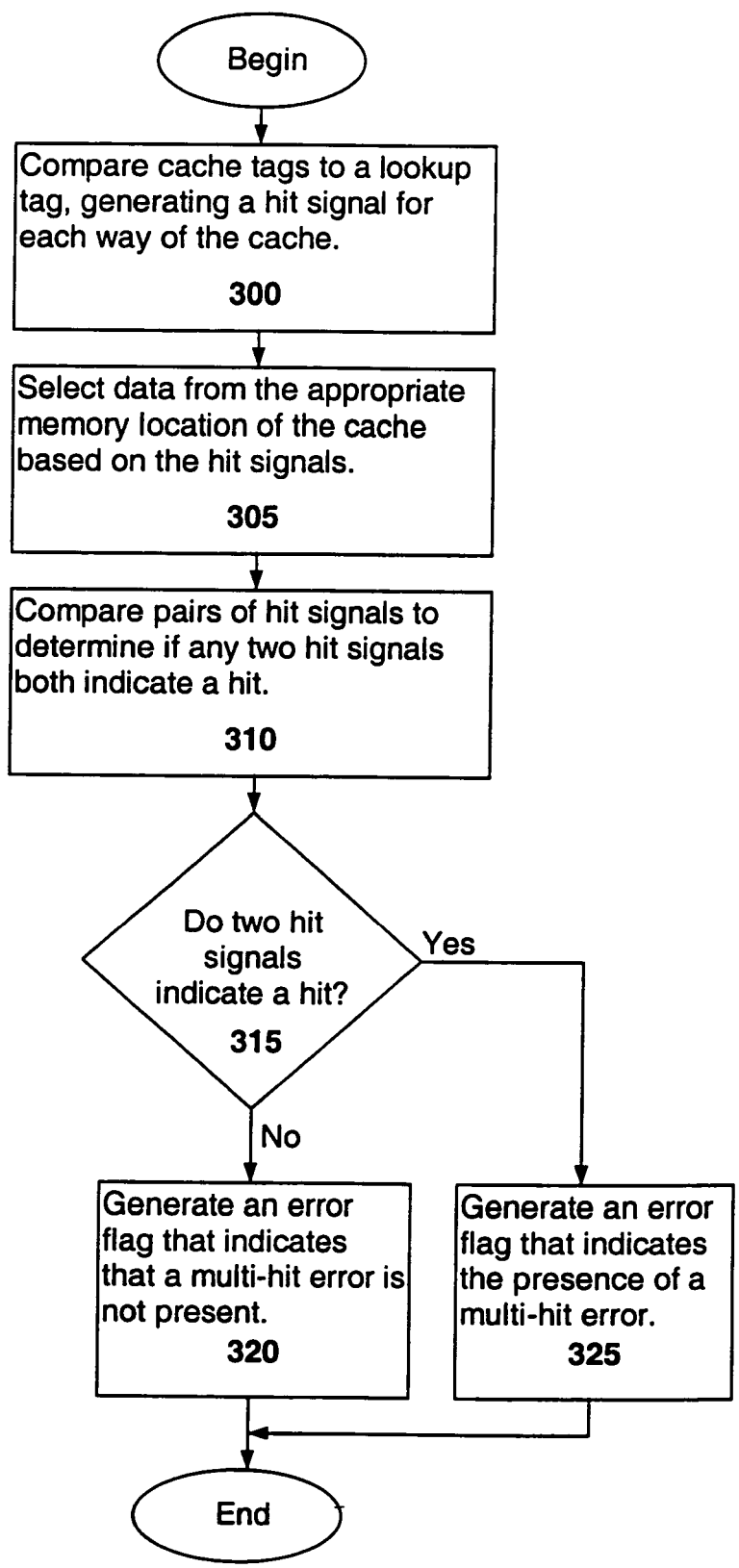
FIG. 3 is a flow chart showing a method of the present invention.

FIG. 3 is a flow chart showing a method of the present invention. At step 300 cache tags stored in multiple ways of an indexed set of memory locations of a cache are compared to a lookup tag using, for example, comparators. A hit signal is generated for each way of the indexed set of the cache. The hit signal indicates a miss if either the lookup tag does not match the associated cache tag or if the cache tag is deemed invalid (by, e.g., the setting of a dirty bit), and indicates a hit if the lookup tag matches the associated cache tag.

At step 305 of FIG. 3, data is selected from the appropriate memory location of the cache based on the hit signals. This may be accomplished by a multiplexer having select inputs coupled to the hit lines to receive the hit signals as described above. In accordance with one embodiment of the present invention, step 305 occurs simultaneously with steps 310, 315, 320 and 325. As used herein, the term "simultaneously" means that the time it takes for a first event to occur overlaps with the time it takes for a second event to occur. The first and second events need not begin and end at the same time to be considered simultaneous.

At step 310, pairs of hit signals are compared to determine if any two hit signals both indicate a hit in the cache. If two hit signals indicate a hit in the cache at step 315, then an error flag is generated that indicates the presence of a multi-hit error at step 325. If two hit signals do not indicate a hit in the cache at step 315 (e.g. only one hit signal indicates a hit or all the hit signals indicate a miss), then an error flag is generated that indicates that a multi-hit error is not present at step 325.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
    a cache having a plurality of hit lines; and
    a selector to provide a data during a clock cycle from a plurality of memory locations associated with the plurality of hit lines in the cache;
    a multi-hit detection circuit coupled to the hit lines to detect multiple hits in the cache during the clock cycle based on hit signals on the hit lines, the multi-hit detection circuit comprising a NAND gate having pull-down transistor pairs coupled to the hit lines to pull an output node of the NAND gate low if two different hit signals include a hit; and
    an error flag generated by an inverter output coupled to the output node of the NAND gate in the multi-hit detection circuit during the clock cycle, the error flag to indicate that the data provided during the clock cycle is invalid if multiple cache hits are detected, the error flag to indicate that the data provided during the clock cycle is valid if a single cache hit is detected.

2. The processor of claim 1, wherein the cache includes a plurality of comparators coupled to the hit lines to generate the hit signals based on comparisons between cache tags and a lookup tag.

3. The processor of claim 2, wherein the selector includes a multiplexer coupled to the hit lines to select data based on the hit signals.

4. The processor of claim 1, wherein the cache is a multi-way set associative cache.

5. A method of detecting multi-hit errors in a cache, the method comprising:
    comparing a plurality of cache tags stored in each of a plurality of ways associated with a indexed set to a lookup tag to generate a plurality of hit signals during a clock cycle;
    selecting selected data from a plurality of memory locations associated with the indexed set based on the plurality of hit signals during the clock cycle;
    comparing pairs of the plurality of hit signals during the clock cycle using a NAND gate with transistor pairs to determine if any two hit signals both indicate a multiple cache hit;
    generating an error flag using an inverter output during the clock cycle to indicate the invalidity of the selected data if the multiple hit is detected; and
    generating the error flag to indicate the validity of the selected data if the multiple cache hit is not detected, wherein the plurality of hit signals are paired to gates of series-coupled pull-down transistor pairs of a NAND gate and an output of the NAND gate is inverted to generate the error flag.

6. The method of claim 5, wherein comparing the plurality of cache tags includes comparing four cache tags of a four-way set associative cache to the lookup tag to generate four hit signals.

7. The method of claim 6, wherein generating the error flag includes providing all pairings of the plurality of hit signals to gates of series-coupled pull-down transistor pairs of a NAND gate.

* * * * *